Jan. 21, 1964     L. PÉRAS     3,118,470
ELECTROMAGNETIC VALVE FOR PNEUMATIC DISTRIBUTION SYSTEMS
Filed April 25, 1960     2 Sheets-Sheet 1
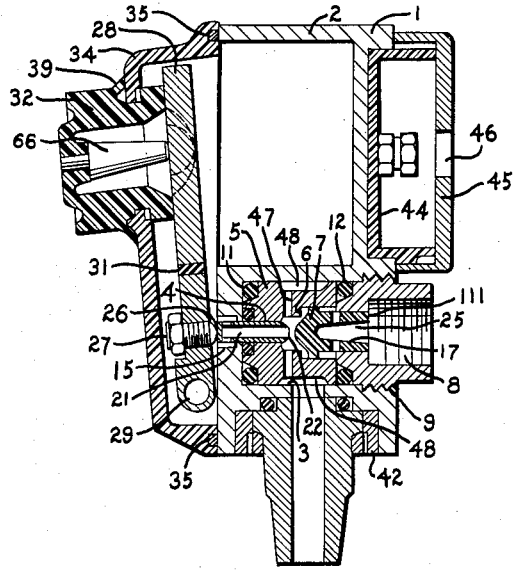
Fig.1
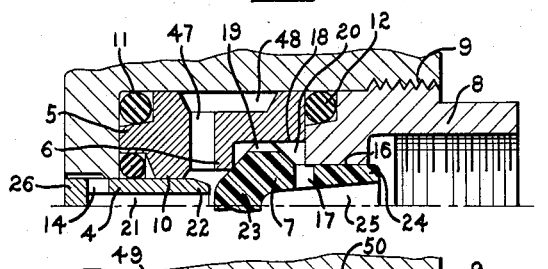
Fig.3
Fig.4
Fig.5
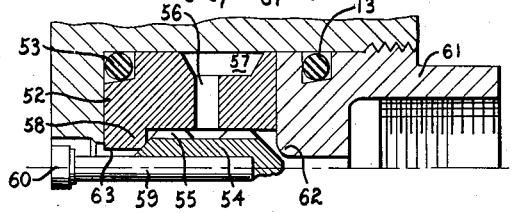
Fig.6
INVENTOR
Lucien Peras
BY *Stevens, David, Miller & Mosher*
ATTORNEYS Jan. 21, 1964        L. PÉRAS        3,118,470

ELECTROMAGNETIC VALVE FOR PNEUMATIC DISTRIBUTION SYSTEMS

Filed April 25, 1960        2 Sheets-Sheet 2

Inventor
Lucien Peras
By Stevens Davis Miller & Mosher
Attorneys 3,118,470
ELECTROMAGNETIC VALVE FOR PNEUMATIC
DISTRIBUTION SYSTEMS
Lucien Péras, Billancourt, France, assignor to Regie
Nationale des Usines Renault, Billancourt, France
Filed Apr. 25, 1960, Ser. No. 24,364
Claims priority, application France May 12, 1959
3 Claims. (Cl. 137—627.5)

This invention relates in general to electromagnetic valves and has specific reference to electromagnetic valves of the type utilized in pneumatic distribution systems.

Many types of electromagnetic valves of this character for handling pressures ranging from the lowest values to the mean and highest values, with a great variety of cross-sectional or passage area, are already known and available.

However, due to the considerable development of pneumatic distribution systems the control of distributors requires electromagnetic valves capable of operating at very high rates of recurrence and utilizing the extremely low current values available in electronics.

It is the object of the present invention to meet this requirement by providing a high-sensitivity electromagnetic valve adapted to operate at very high repetition rates and by means of particularly low current values of the order of a few milliamperes.

With the foregoing and other objects in view, the invention resides in the novel arrangement and combination of parts and in the details of construction hereinafter described and claimed, it being understood that changes in the precise embodiments of the invention herein disclosed may be made within the scope of what is claimed without departing from the spirit of the invention.

Other objects and advantages of this electromagnetic valve are listed hereinafter:

Possibility of maintaining the coil energized without overheating;

Reduced over-all dimensions of the electromagnetic valve which on the other hand may be operated from A.C./D.C.;

Manual control in addition to the electromagnetic control;

Easy unsticking of the movable valve assembly affording a great safety of operation;

Fluid-tightness of the detachable valve assembly which is ensured by the provision of plastic lips or toroidal packings or gaskets;

Provision of a transparent cover permitting a visual checking of the push-lever and of the rate of operation;

Possibility of incorporating the electromagnetic valve either in a normally closed circuit or in a normally open circuit.

The invention will now be described with reference to the attached drawings showing further advantages and features of the invention. In the drawings:

FIG. 1 is an axial vertical section;

FIG. 3 shows on a larger scale a detail of the assembly illustrated in FIG. 1, with components made of metal such as brass or any other adequate alloy, in the case of a valve incorporated in a normally closed circuit;

FIG. 4 is a view similar to FIG. 3 but comprising plastic components;

FIGS. 5 and 6 are views similar to FIGS. 3 and 4 but showing the case of a valve for a normally open circuit;

Figure 2:
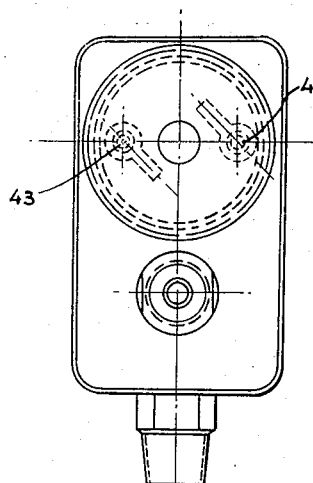
FIG. 2 is a rear elevational view of the valve.

From the figures of the drawings it is clear that the electromagnetic valve of this invention (which is of the type adapted to be incorporated in a normally closed circuit) comprises a case 1 of metal or plastic material and is formed with two bores 2, 3 constituting chambers receiving in the former an electromagnetic attraction box complete with its core, and the other an assembly comprising a push-member 4, a push-member receiving ring 5 formed with the valve seat 6, the valve member proper 7 and the air inlet pipe connecting nozzle 8. This assembly mounted beforehand is introduced into its bore in the case and screwed in the portion 9 thereof.

The metal push-member 4 slides freely in the bore 10 formed in the ring 5. The latter, as shown in FIG. 1, is a metal ring, preferably of brass or any other adequate alloy. A toroidal packing 11 provides the necessary fluid-tightness between this ring 5 and the bore 3. The valve member 7 fitting between the ring 5 and the screwed pipe nozzle 8 is adapted to engage, or move away from, its seat 6.

The valve member 7 is guided by the bore 16 of nozzle 8 as well as by the bore 18 of ring 5 due to the provision of splines or like ribs 19 formed on the valve member which constitute an annular air passage communicating with the chamber 20.

The push-member shown in FIG. 3 consists of a cylindrical body 4 formed with an inner duct 21 ending with a pair of ducts 14 opening into the bore 15 of the valve body.

During the operation of the device the used air escapes through these passages or ducts 14 as well as through the bore 15.

The end portion 22 of push-member 4 constitutes the seat of the valve member 7. This valve member 7 consists of elastic material such as synthetic or natural rubber, or plastic material, and is formed with a head 23 of frustoconical configuration with a rounded tip, and a cylindrical portion 24 of smaller diameter sliding freely in the bore of nozzle 8. The inner cavity 25 communicates through the aforesaid ducts 17 with the chamber 20 surrounding the valve head normally engaging the other seat 6 of the valve 7 carried by the ring 5.

The portion 26 of the push-member receives through the medium of an adjustment screw 27 the thrust from the soft-iron lever or plate 28 fulcrumed on a pivot pin 29 carried by the case, this lever 28 having its upper or free end adapted to be attracted by the coil contained in the bore 2.

Figure 7:
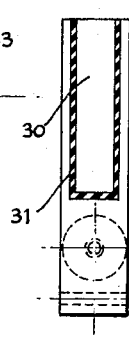
FIG. 7 is a plan view showing the pivoting lever or plate of the electromagnet.
Figure 9:
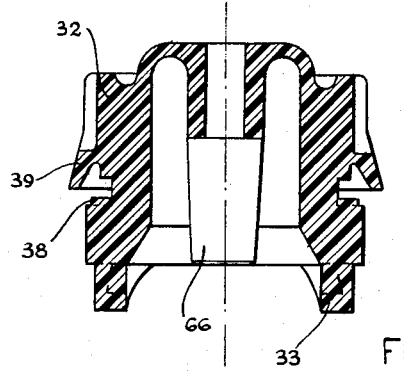
FIG. 9 is a vertical section showing the push-button of the electromagnet pivoting lever or plate.
Figure 10:
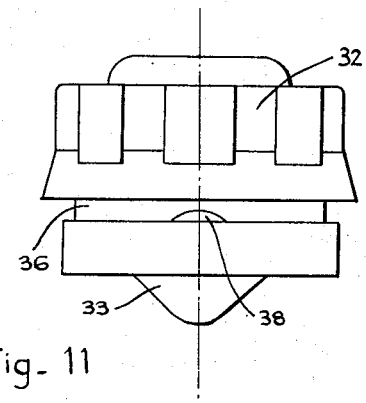
FIG. 10 is an elevational view of the button shown in FIG. 9.
Figure 11:
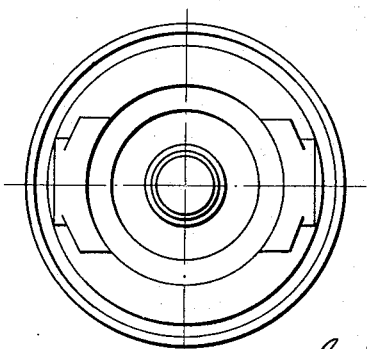
FIG. 11 is a plan view from beneath of the push-button of FIG. 9.

The plate 28 contains a blade 30 (FIG. 7) of magnetic iron which is caused to adhere by means of rubber 31 to the plate 28. The latter may also be actuated by a manual pressure exerted upon the rubber button 32, a cam-face device 33 (FIGS. 9 and 10) being provided for holding this button in its depressed condition at the operator's option.

A cover 34 of transparent plastic material fits on the mechanism, a gasket 35 constituting a sealing connection with the case of the apparatus.

Figure 8:
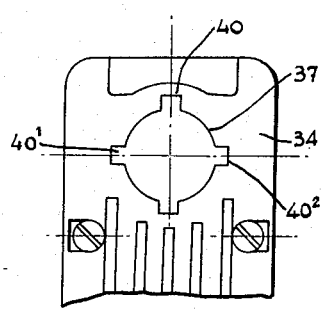
FIG. 8 is a fragmentary view showing the cover of the electromagnet pivoting lever or plate.

The aforesaid button 32 is characterized by the following features:

The body 36 (FIGS. 8, 9 and 10) is engaged in the aperture 37 and retained on the one hand by a pair of peripheral projections 38 and on the other hand by a collar 39. The button 32 is locked in a stable position when, after having rotated in the projections 38 fit into the notches 40 (FIG. 8) formed in the case. Under these conditions, the button 32 may be depressed without interfering with its mounting in the case. In this position the particularly flexible collar 39 engages the outer plan face of the cover 34 but may be easily lifted to permit the venting of exhaust air from inside the case where the pressure is higher therein. On the other hand, it constitutes an efficient seal against the ingress of impurities or foreign substances carried by the external or atmospheric air.

This button 32 is formed internally with a central projection 66 adapted, in the inoperative position of the button, to lightly contact the lever 28 without heavily bearing thereagainst. It is this central projection that pushes the lever 28 when the button is depressed. During this movement the thinner lips of collar 39 are somewhat flattened and their elastic tension will restore the button to its initial position when the pressure is released.

The cam-face or ramp device mentioned hereinabove operates as follows: When the button is normally positioned the peripheral projections 38 thereof are anchored in the notches $40^1$ and $40^2$ (FIG. 8) and the two cam faces 33 of the button emerge in the free space on either side of the lever 28, without interfering whatsoever with the stroke-by-stroke operation of the button.

If the operator wishes to maintain the apparatus controlled by this valve under pressure during an operation, he simply rotates the button through about 90°, so that the ramps or cam faces 33 will leave their lateral position and engage the outer face of lever 28 so as to maintain the latter in its depressed condition; thus, the operator may release the button.

When it is desired to restore the button to its normal position, the operator rotates again this button through one-fourth of a revolution so as to retract the cam faces and refit the peripheral projections 38 into their notches.

The nozzle 41 for connecting the load pipe to the valve is secured on the case by means of a nut 42 in the fashion of three-element fittings. Therefore, it is adapted to be set in different angular positions.

The coil is secured on the case by the two bolts 43 acting at the same time as lead-in terminals. These bolts hold in position a detachable insulating cup 44 on which a cover 45 may be screwed, the conductors (not shown) passing through an orifice 46.

The electromagnetic valve for normally closed circuits (that is, a valve adapted, upon energization of its coil or depression of the manual control button 32, to deliver compressed air to the load line) operates as follows:

Assuming that the electromagnetic valve is connected to the compressed-air mains through its nozzle 8 and to a distributor through its other nozzle 41, and that, after an impulse, the distributor has just been vented to the atmosphere.

The valve member 7 is seated at 6 by the air pressure prevailing in the chamber 25 as well as in the space 20 surrounding the valve member due to the provision of the orifices 17.

If, under these conditions, the operator depresses the manual control button 32 (or if the coil is energized), the seat 22 of the push-member will first engage the valve head 23 to close the passage leading to the exhaust, and then unseats the valve member to free the passage for the compressed air which will thus flow through ducts 47, annular space 48 and nozzle 41 to the distributor where it will remain effective as long as the button 32 is depressed.

Now it will be seen that the seats of valves 6 and 22 used for the inlet and exhaust respectively have substantially equal diameters due to the shifting of their planes in the axial direction and to their small dimensions.

As a result, a reduced effort is sufficient for unseating the valve portion 23. Immediately as the button 32 is released, the valve member is reseated by the mains pressure and the feed line leading to the distributor is cut off; then, as the push member receives on its end 22 the pressure prevailing in the distributor, it is quickly restored to its rear position, thus opening the exhaust for venting the air from the distributor.

Under these conditions, the device resumes its initial position and is ready to receive another impulse.

It will be noted that as the moving parts are particularly light and their movements of particularly moderate amplitude, the inertia of these components is quite negligible. Thus, particularly high rates of operation may be obtained.

Moreover, as the core of the magnetic circuit is made from relatively thin laminated plates characterized by low magnetic losses the current may be maintained, if necessary, without any risk of abnormal heating and without impairing the electromagnet coil or any other element of the apparatus.

It may also be noted that the mounting of the coil on the case is completely independent of the pneumatic equipment, so that it can be replaced very easily without requiring any preliminary dismantling.

In the foregoing only the case of an electromagnetic valve incorporated in a normally closed circuit, that is, as shown in FIG. 3, has been contemplated, the device comprising in this case a metal ring 5 and a metal nozzle 8.

As an alternate embodiment the same type of valve may be constructed with these two elements made from an adequate plastic material, as exemplified in FIG. 4. In this case, the ring 5 has the specific configuration illustrated, the sealing engagement with the bore 3 being provided by the lip 49. The nozzle 8 is also sealed with respect to this bore 3 by the lip 50 and to the ring 5 by the lip 51.

Except for these changes, the assembly and its operation are the same as in the preceding embodiment.

In the embodiment illustrated in FIGS. 5 and 6, the electromagnetic valve is of the normally open circuit type, that is, adapted when the push-button is depressed or the coil energized to cut off the supply of compressed air and open the exhaust, instead of introducing compressed air into the load line.

This alternate embodiment is particularly advantageous when for example an apparatus is supplied with compressed air from the main so that the actuation takes place when the air is vented to the atmosphere.

The assembly illustrated in FIG. 5 comprises the ring 52 with its toroidal packing 53, the valve member 54 with its splines or like ribs 55 guiding same in the bore 3; the duct 56 opening into the annular space 57 and then into the nozzle 41 connected to the distributor, the seat 58 carried by the ring 52, the push-member 59 controlling the valve member the head 60 of which is the point of application of the screw 27 of lever 28; then, after the ring 52, the nozzle 61 with its toroidal gasket 13 carrying the seat 62 engageable by the valve member 54 upon completion of its stroke in this direction.

Assuming that this assembly has been fitted in the valve as a substitute for the device illustrated in FIGS. 1 and 3, the electromagnetic valve for a normally open circuit operates as follows:

The manual control button is inoperative and the coil de-energized; the valve 54 engages its seat 58 in the position shown in FIG. 5.

The load apparatus is connected through the nozzle 61, seat 62, ducts 56, annular space 57 and nozzle 41 to the mains.

If the operator depresses the button 32 or if the coil is energized, the lever 28 will move the push-member 59 backwards, thus causing the latter to urge the valve member 54 against its seat 62 and cut off the supply of compressed air. At the same time, the air contained in the load apparatus is vented through the nozzle 41, annular space 57, ducts 56, bore 63 and the chamber of cover 34, and finally around the lips 39 of button 32.

This operative condition of the apparatus prevails as long as the button 32 is depressed or the coil energized.

Immediately as this control action ceases the pressure existing in the tubular nozzle 61 acts upon the valve member 54 to move the push-member 59 as well as the lever 28 backwards, and the valve resumes its initial condition and is ready for another impulse.

As in the preceding case, this assembly may be constructed (see FIG. 6) with a plastic ring 52 and a plastic nozzle 61. The toroidal gaskets or packings 53 and 13 of FIG. 5 are replaced in this case by lips 64, 65. The valve member 54 and push-member 59 remain identical and the operation of the thus modified valve assembly is the same.

It may also be noted that the electromagnetic valve for normally open circuit as shown in FIGS. 5 and 6 is characterized by an additional feature in comparison with conventional valves for normally closed circuits.

Indeed, in these conventional arrangements the pressure to be overcome by the push-member actuation is proportional to the surface area of the circle having the diameter designated by the reference numeral 67 in FIGS. 3 and 4; in valves for normally closed circuits the pressure to be overcome is also proportional to the surface area of the circle having a diameter 68 (see FIGS. 5 and 6). Now, it has been found that given equal cross-sectional areas, the diameter 68 is considerably smaller than the diameter 67. Thus, with this last-mentioned type of valve, electromagnet coils of lower magnetic force and operating therefore with lower current values may be used.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

I claim:

1. Electromagnetic valve for pneumatic distribution system comprising a body formed with two separate cavities, an electromagnetic case with a core mounted in one cavity, an assembly constituting a three-way valve mounted in the other cavity and composed of a plug member sliding within cylindrical bores and having a conical bearing surface, a pair of seats with which the bearing surfaces cooperate, one of the bearing surfaces and its seat controlling the passage of compressed air from a feed line to a load line and the other bearing surface and its seat controlling the passage of air from the load to an exhaust, a push member extending outside of the body and controlling the movement of the plug member, said push member having an outer supporting surface and an actuating plate engageable with the supporting surface to actuate the push member, said plate being responsive to the action of the electromagnetic case, the plug member having a body in the form of a hollow mushroom, said plug-member body having a cavity facing towards an inlet for compressed air, said plug-member body having a stem, said valve body having a first bore in which the stem slides, said plug-member body having a head, the circumference of which slides within a second bore having a larger diameter than the first bore, said stem having lateral openings formed therein and the head having axial ducts provided at its periphery allowing the passage of air between the cavity of the plug-member body and the space beyond its head through the lateral openings provided in the stem and the axial ducts provided at the periphery of the head, said valve body having a third bore aligned with the second bore and of a diameter similar to the first bore and forming with the second bore a stationary seat for the head of the plug-member body, said third bore being pierced with apertures that are radial with respect to the load, the push member being hollow and cylindrical and sliding in a fourth bore having a diameter slightly smaller than that of the third bore, said push member presenting at its inner end a circular edge constituting a seat for the head of the plug member, said seat being movable, concentric, of smaller diameter and axially offset with respect to the stationary seat and cooperating with the central region of the head of the plug member to control the passage of air from the load to the exhaust through the push member, said push member being provided for this purpose at its outer end with openings that communicate with the exhaust.

2. Electromagnetic valve for pneumatic distribution system comprising a body provided with two separate cavities, an electromagnetic case with a core mounted in one cavity, an assembly constituting a three-way valve mounted in the other cavity and composed of a plug member sliding within cylindrical bores and having conical bearing surfaces, a pair of seats with which the bearing surfaces cooperate, one of the bearing surfaces and its seat controlling the passage of compressed air from a feed line to a load line and the other bearing surface and its seat controlling the passage of air from the load to an exhaust, a push member controlling movement of the plug member, said push member having an outer supporting surface, an actuating plate engageable with the supporting surface to actuate the push member, a manual control push-button, said plate being responsive to the selective operation of the electromagnetic case and the push-button, said push-button being made of resilient material and having a cylindrical hollowed-out form with an inner centrally located projection, a cover enclosing the actuating plate, said cover having an opening within which the push-button is resiliently mounted by a groove receiving the edge of the opening in said cover, said edge having notches in which are received corresponding projections of said push-button which determine the stable annular positions of the push-button, one of these positions permitting the blocking of the plate in supporting positions with the aid of a cam face carried by the lower edge of said push-button, said inner centrally located projection transferring to said actuating plate all manual efforts exerted on said push-button.

3. Electromagnetic valve according to claim 2 wherein the exterior edge of the groove that maintains the push-button on the cover is in the shape of a resilient lip constituting a discharge valve for the exhaust.

References Cited in the file of this patent
UNITED STATES PATENTS

| | | |
|---|---|---|
| 2,681,076 | Osburn | June 15, 1954 |
| 2,682,386 | Lindsay | June 29, 1954 |
| 2,862,684 | Ander | Dec. 2, 1958 |
| 2,932,978 | Newberry | Apr. 19, 1960 |